US006439583B1

(12) United States Patent
Markowetz

(10) Patent No.: US 6,439,583 B1
(45) Date of Patent: Aug. 27, 2002

(54) ACTUATOR

(75) Inventor: Johannes Markowetz, Schwäbisch Gmünd (DE)

(73) Assignee: ZF Lenksysteme GmbH, Schwabisch Gmund (DE)

( * ) Notice: Subject to any disclaimer, the term of this patent is extended or adjusted under 35 U.S.C. 154(b) by 0 days.

(21) Appl. No.: 09/688,995

(22) Filed: Oct. 16, 2000

(30) Foreign Application Priority Data

Oct. 20, 1999 (DE) .......................................... 199 50 624

(51) Int. Cl.[7] .............................................. B60G 17/01
(52) U.S. Cl. ............................. 280/5.511; 280/124.106
(58) Field of Search ....................... 280/5.511, 124.106, 280/124.152

(56) References Cited

U.S. PATENT DOCUMENTS

| 4,919,444 A | | 4/1990 | Leiber et al. ................ 280/707 |
| 4,973,077 A | * | 11/1990 | Kuwayama et al. ......... 280/689 |
| 5,076,605 A | * | 12/1991 | Umeda ......................... 280/689 |
| 5,141,088 A | | 8/1992 | Kurihara et al. ............ 192/67 R |
| 5,251,926 A | | 10/1993 | Aulerich et al. ............. 280/665 |
| 5,437,354 A | * | 8/1995 | Smith .......................... 188/299 |
| 5,480,186 A | * | 1/1996 | Smith .......................... 280/772 |
| 5,505,480 A | * | 4/1996 | Pascarella .................... 280/689 |
| 5,529,324 A | | 6/1996 | Krawczyk et al. ........ 280/112.2 |
| 5,549,328 A | | 8/1996 | Cubalchini .................. 280/772 |
| 6,022,030 A | * | 2/2000 | Fehring ..................... 280/5.511 |
| 6,149,166 A | * | 11/2000 | Struss et al. .............. 280/5.511 |

FOREIGN PATENT DOCUMENTS

| DE | 20 53 649 A | 5/1972 |
| DE | 36 11 361 A | 10/1987 |
| DE | 37 40 244 C2 | 2/1990 |
| DE | 198 55 343 A1 | 6/2000 |
| EP | 0 344 183 B1 | 12/1989 |
| GB | 2 220 625 | 1/1990 |
| JP | 62 221909 A | 9/1987 |
| WO | WO 00/371371 | * 11/2000 |

* cited by examiner

Primary Examiner—Paul N. Dickson
Assistant Examiner—Deanna Draper
(74) Attorney, Agent, or Firm—Davis & Bujold, P.L.LC.

(57) ABSTRACT

Actuator having at least three coupling elements connected with stabilizers (3, 5) and coupling splines (4, 16, 17), wherein one axially movable coupling element (10) is prestressed by a spring (11) while the other coupling elements are firmly connected with said stabilizers, and a pressure chamber (12) whose internal pressure regulates the disengagement operation.

11 Claims, 3 Drawing Sheets

ACTUATOR

BACKGROUND OF THE INVENTION

In EP 344 183 B1 has been described an actuator in the form of a positive-fit shaft coupling in which a quick engagement and disengagement of two shaft parts is made possible by the fact that at least one of the two coupling halves is equipped with drivers which engage in recesses of the other coupling half or of a part connected therewith and the relative position of the drivers can be changed to two shift positions so that different rotational angles can be adjusted between the shaft parts to be coupled. The coupling halves have distributed on the periphery drivers in the form of driver bolts which carry rollers. The latter engage in recesses designed as guide grooves of a coupling sleeve.

Disadvantageous in the prior art such as described in EP 344 183 B1 is the fact that due to the design principle with the drivers distributed on the periphery, a larger radial installation space is needed which, in the first place, limits the ground clearance in off-road vehicles and that, due to the multiplicity of small structural parts, the resulting high sensitivity to soiling can impair operation.

The problem on which this invention is based is to show an actuator which, because of its small radial extension, does not limit the ground clearance of motor vehicles and yet can transmit strong torques and allow firm teeth settings.

SUMMARY OF THE INVENTION

This problem is solved by a generic actuator incorporating the present invention.

Because of the compact design mainly in radial direction and reduced number of structural parts susceptible to failure and sensitive to soiling, the actuator, according to the invention, is particularly adequate for installation in vehicles used in difficult grounds. By integrating the driver and prestressed springs in a housing, it is possible to reduce installation space and the multiplicity of structural parts.

An annular coupling element with an internal driver preferably designed as internal tooth forms a housing bottom and is connected with a stabilizer. A second annular coupling element has an external driver connected with one other stabilizer. A third coupling element is preferably designed as an axially displaceable piston with teeth contours adapted to the two other coupling elements. By the interaction of the three coupling parts, a very stable construction can be shown on small installation space. The coupling splines of the individual coupling elements can be adapted to the particular utilization. They can be designed, e.g. as teeth or shaft/hub connections. Besides, the effective torsional length of the actuator is not limited by the compact design. This is made possible primarily by a stabilizer that passes through the actuator. To avoid an expensive surface machining of the stabilizer and makes an optimum service life of the structural part possible, a housing cover can be connected with the stabilizer by a low-friction bearing bush. The low-friction bearing bush is secured on rods. An expensive machining of the stabilizer can thus be eliminated. In the coupling element designed as piston, an end cutoff can be integrated which can work mechanically, electrically, or hydraulically. Besides, a valve function can be integrated in the coupling element designed as piston.

BRIEF DESCRIPTION OF THE DRAWINGS

Different embodiments of this invention are described in principle with reference to the drawings wherein.

DESCRIPTION OF THE PREFERRED EMBODIMENTS

Figure 1:
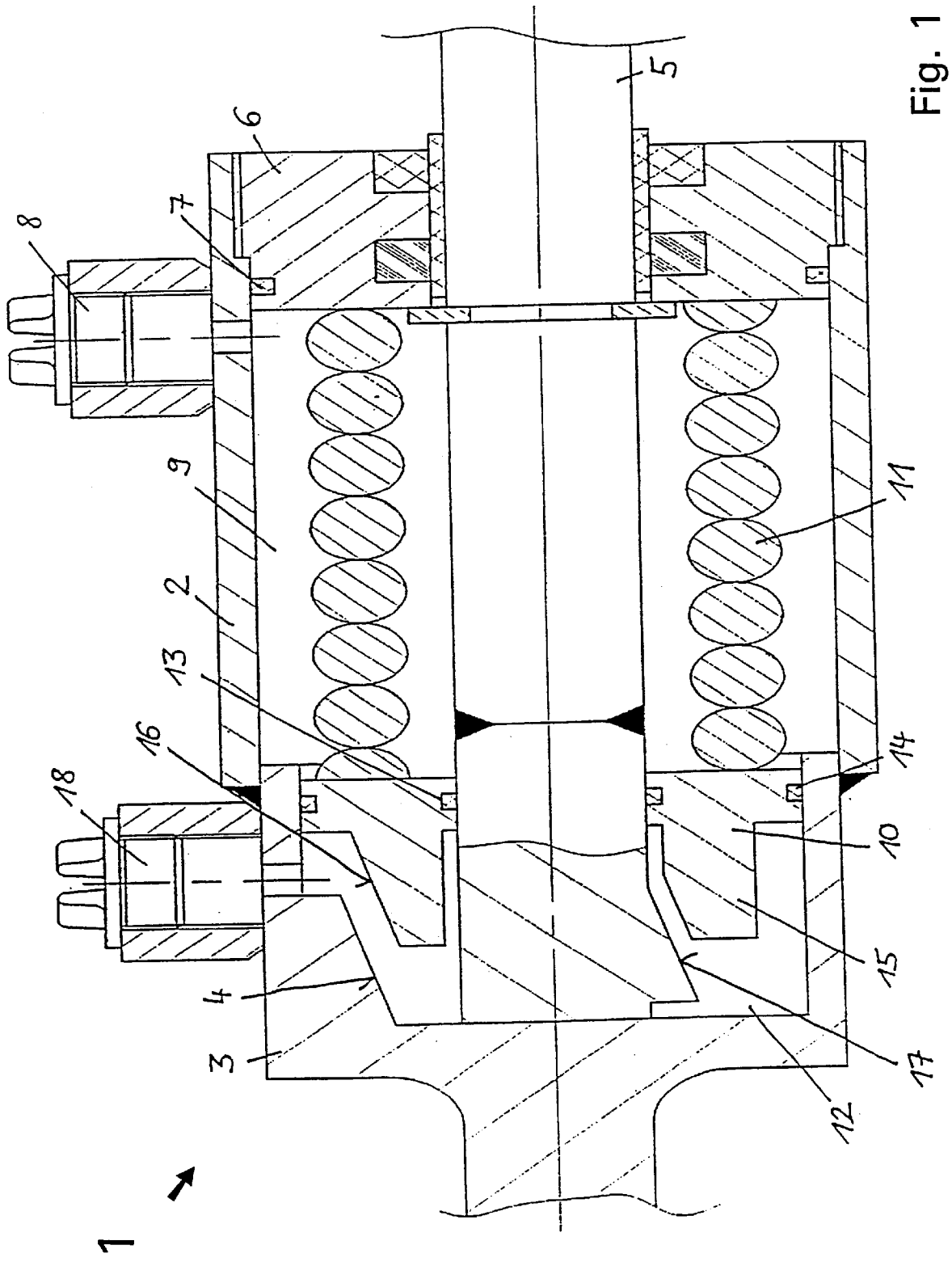
FIG. 1 is a constructional embodiment of an inventive actuator.

In FIG. 1 is shown a constructional design of an inventive actuator 1. A housing 2 is firmly connected with a stabilizer 3. The housing 2 has a coupling spline 4 which can be adapted to the particular utilization for which it is required. A second stabilizer 5 is displaceably supported in a housing cover 6 and provided with a seal 7, which encloses in a pressure chamber 9, the actuation pressure introduced through a connection 8. A coupling element 10 designed as a piston is loaded by a spring 11 against the pressure acting in a pressure chamber 12, i.e. when there is high pressure force in the pressure chamber 12, a disengagement occurs. Under low pressure, high spring force engagement occurs. The coupling element 10, designed as a piston, has seals 13 and 14 which separate from each other the pressure chambers 9 and 12. The coupling element 10 has a prolongation 15 with a coupling spline 16 which interacts with the coupling spline 4. Upon the stabilizer 5 is situated one other coupling spline 17 which is in an operative connection with the coupling splines 4 and 16. The pressure chamber 12 can be loaded with pressure via a connection 18 so that the coupling splines 4, 16 and 17 allow an adjustable slewing range in which stabilizers 3 and 5 can be rotated relative to each other.

By reducing the diameter of the connections 8 and 18, a hydraulic damping can additionally be shown by the inventive actuator 1. The coupling splines 4, 16 and 17 always overlap axially in the disengaged state so that the stabilizers 3 and 5 automatically engage during a pressure breakdown.

Figure 2:
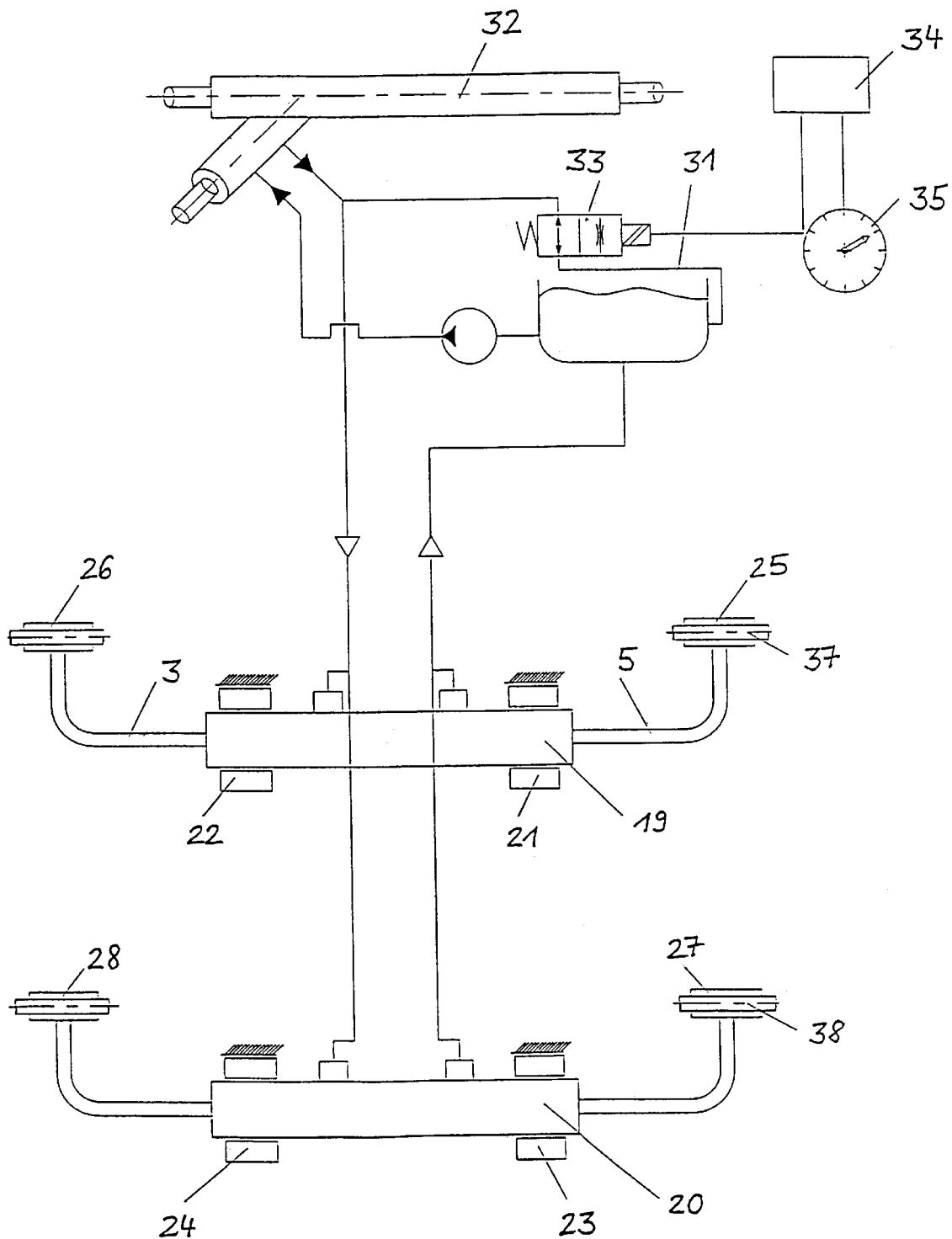
FIGS. 2 and 3 are examples of utilization of an inventive actuator.

FIG. 2 show a utilization of inventive actuators 19 and 20 with appertaining energy supply and control system.

According to the invention, on the bottom (not shown) of a multi-axle vehicle, actuators 19 and 20 are supported on swivel bearings 21, 22, 23 and 24. On the external ends of the stabilizes 3 and 5 of similar construction, additional swivel bearings 25, 26, 27 and 28 are mounted which also axially fix the stabilizers 3 and 5, respectively, on the vehicle axles 29 and 30.

The pressure required for the disengagement of the actuators 19 and 20 is produced by an electromagnetically actuatable control valve 33 installed in a return pipe 31 of a steering system 32. The control valve 33 is actuated at the low speed range for the cases when in difficult ground the vehicle would effect great shaking movements over stiff stabilizers. The disengagement can be activated automatically by an electronic control unit 34 via a speed signal delivered by a tachometer 35 or manually via a switch (not shown). But for reasons of safety, the engagement must be automatic when high transverse accelerations occur and according to a limiting speed.

The control valve 33 is advantageously shifted so that the power coupling on the actuators 19 and 20, i.e. the engagement of the coupling splines 4, 16 and 17, are automatic in case of failure of the electric system. This is required in order to limit the angle of shaking during high speeds and transverse accelerations. Since the driving on difficult ground at low speeds and disengaged actuators 19 and 20 makes up only a very small portion of the utilization time of the vehicle, it is especially advantageous for energy supply to use the oil hydraulic system of the steering system 32.

Figure 3:
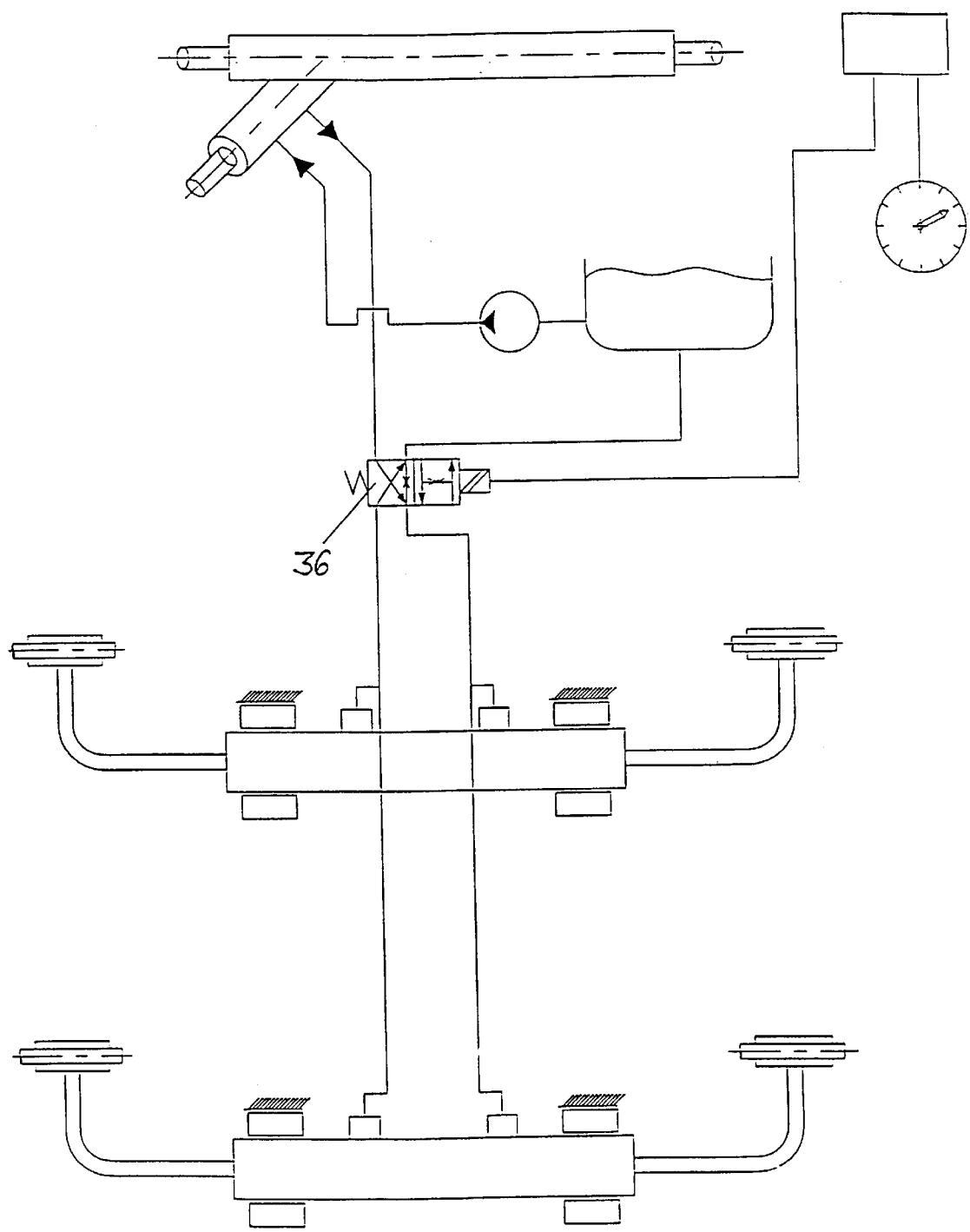

The example of utilization shown in FIG. 3 stands out by an alternative control of the inventive actuators 19 and 20. By virtue of a control valve 36 the hydraulics of the steering system 32 at very high actuator forces can be used to assist the spring 11 in the engagement operation.

REFERENCE NUMERALS 1 actuator
2 housing
3 stabilizer
4 coupling spline
5 stabilizer
6 housing cover
7 seal
8 connection
9 pressure chamber
10 coupling element
11 spring
12 pressure chamber
13 seal
14 seal
15 prolongation
16 coupling spline
17 coupling spline
18 connection
19 actuator
20 actuator
21 swivel bearing
22 swivel bearing
23 swivel bearing
24 swivel bearing
25 swivel bearing
26 swivel bearing
27 swivel bearing
28 swivel bearing
29 vehicle axle
30 vehicle axle
31 recoil pipe
32 steering system
33 control valve
34 control unit
35 tachometer
36 control valve

What is claimed is:

1. An actuator (1) for providing rotational engagement and disengagement between a first stabilizer shaft and a second stabilizer shaft for a motor vehicle, the actuator comprising:

a first coupling element, a second coupling element and a third coupling element defining a pressure chamber (12), the first coupling element being integrally with the first stabilizer shaft and the second coupling element being integrally with the second stabilizer shaft; and the third coupling element being supported by an axially movable piston slidable along the second stabilizer shaft; and a spring biasing the piston towards an engaged position, when a lower pressure is supplied to the pressure chamber (12), and the piston overcoming the bias of the spring and moving the piston to a disengaged position, when a higher pressure is supplied to the pressure chamber (12); and in the engaged position of the piston, the piston (10) being biased by the spring to move the third coupling element into direct contact with both the first coupling element (4) on the first stabilizer shaft (3) and the second coupling element (17) on the second stabilizer shaft (5) and, in the disengaged position, the higher pressure in the pressure chamber overcomes the bias of the spring and causes the third coupling element to disengage from the first and second coupling elements.

2. The actuator according to claim 1, wherein the first coupling element, the second coupling element, and the third coupling element are each provided with mating splines.

3. The actuator according to claim 2, wherein the splines of the first coupling element, the second coupling element, and the third coupling element are radially oriented with respect to a longitudinal central axis of the actuator (1).

4. The actuator according to claim 2, wherein a coupling angle between the splines of the first coupling element, the second coupling element, and the third coupling element (4, 16, 17) and the bias of the spring provide a continuous engagement between the first coupling element, the second coupling element, and the third coupling element (4, 16, 17), when the actuator is in the engaged position, to prevent the first coupling element, the second coupling element, and the third coupling element (4, 16, 17) from inadvertently disengaging from one another due to vibration forces which may occur in the actuator.

5. The actuator according to claim 1, wherein the actuator is installed under a vehicle and connected with at least one vehicle axle, via the first and second stabilizer shafts (3, 5) and swivel bearings (21, 22, 26, 27), for stabilizing vibration in vehicle, and the higher pressure provided for actuating the actuator to the disengaged position is controlled by an electromagnetically actuated control valve (33) installed in a return pipe (31) of a steering system (32) for the vehicle.

6. The actuator according to claim 5, wherein the control valve (33) is connected to and automatically actuated by an electronic control unit (34), and the electronic control unit (34) controls the control valve (33) based on a speed signal received from a tachometer (35).

7. The actuator according to claim 6, wherein the actuator (19 or 20) is connected to the steering system (32) and pressure from the steering system (32) controls operation of the actuator.

8. The actuator according to claim 5, wherein the control valve is used for engagement of the actuator and the control valve is pressurelessly switched after termination of engagement of the actuator.

9. The actuator according to claim 1, wherein a pair of actuators are installed in a vehicle, and actuation of the pair of actuators is controlled by a pump and at least one pressure switch.

10. The actuator according to claim 1 in combination with a vehicle for stabilizing vibration in the vehicle, wherein the actuator functions as a spring pressure accumulator to compensate for leakages and maintain a functionality of the actuator.

11. An actuator (1) for stabilizing roll of a vehicle, the actuator comprising a first stabilizer shaft and a second stabilizer shaft, the first stabilizer shaft having a first coupling element and the second stabilizer shaft having a second coupling element;

a pressure chamber (12) facilitating engagement and disengagement of the first stabilizer shaft and the second stabilizer shaft so that when a lower pressure is supplied to the pressure chamber (12), a spring biases the first coupling element into engagement with the second coupling element and, when a higher pressure is supplied to the pressure chamber (12), the higher pressure overcomes the bias of the spring and the first coupling element disengages from the second coupling element; and the actuator having a third coupling element which comprises a piston (10), the piston is axially displaceable against the bias of the spring, and the pressure chamber (12) is defined by the first coupling element, the second coupling element and the third coupling element.

* * * * *